US012802205B2

(12) United States Patent
Kondo et al.

(10) Patent No.: US 12,802,205 B2
(45) Date of Patent: Nov. 17, 2026

(54) INSPECTION METHOD, INSPECTION APPARATUS, AND INSPECTION PROGRAM FOR DISK-SHAPED GRADUATION PLATE

(71) Applicant: MITUTOYO CORPORATION, Kawasaki (JP)

(72) Inventors: Kasumi Kondo, Kanagawa (JP); Hiroaki Kawata, Brussels (BE); Masaoki Yamagata, Kanagawa (JP); Jota Miyakura, Chiba (JP)

(73) Assignee: MITUTOYO CORPORATION, Kawasaki (JP)

( * ) Notice: Subject to any disclaimer, the term of this patent is extended or adjusted under 35 U.S.C. 154(b) by 321 days.

(21) Appl. No.: 18/394,714

(22) Filed: Dec. 22, 2023

(65) Prior Publication Data

US 2024/0212129 A1 Jun. 27, 2024

(30) Foreign Application Priority Data

Dec. 22, 2022 (JP) ................................ 2022-206091
Nov. 27, 2023 (JP) ................................ 2023-200248

(51) Int. Cl.
*G06T 7/00* (2017.01)

(52) U.S. Cl.
CPC .... *G06T 7/001* (2013.01); *G06T 2207/20168* (2013.01); *G06T 2207/30164* (2013.01)

(58) Field of Classification Search
CPC ......... G06T 7/0002; G06T 2207/30108; G06T 2207/30164
See application file for complete search history.

(56) References Cited

U.S. PATENT DOCUMENTS 5,287,293 A * 2/1994 Chen ..................... G06T 7/0006 382/152
2001/0043736 A1* 11/2001 Nakajima ............. G06T 7/0002 382/152

(Continued)

FOREIGN PATENT DOCUMENTS

JP 57-061165 B2 12/1982
JP 2846217 B2 1/1999

(Continued)

*Primary Examiner* — Sumati Lefkowitz
*Assistant Examiner* — Wayne Zhang
(74) *Attorney, Agent, or Firm* — Oblon, McClelland, Maier & Neustadt, L.L.P.

(57) ABSTRACT

An inspection method includes an image-data acquisition step of acquiring data about an image of a disk-shaped graduation plate as disk-shaped graduation-plate image data, and a polar-coordinate transformation step of transforming the disk-shaped graduation-plate image data into polar coordinates using a center of the disk-shaped graduation plate as a reference to generate polar-coordinate graduation image data. A defect detection step includes a processing-region setting step of setting a processing region for each of graduation line on a polar-coordinate angle display axis, a center-of-gravity calculation step of calculating a center of gravity for each processing region, and a center-of-gravity pitch calculation step of calculating a pitch of the center of gravity calculated in the center-of-gravity calculation step. the defect detection is executed by comparing a pitch of graduations in the polar-coordinate graduation image data with a predetermined reference value.

8 Claims, 17 Drawing Sheets

(56) References Cited

U.S. PATENT DOCUMENTS

| | | | | |
|---|---|---|---|---|
| 2007/0189631 | A1* | 8/2007 | Wu | G06T 5/70 382/266 |
| 2009/0218509 | A1* | 9/2009 | Ito | H01J 37/20 250/442.11 |
| 2018/0365816 | A1* | 12/2018 | Park | H04N 23/71 |
| 2019/0005639 | A1* | 1/2019 | Sanekata | G06T 7/001 |

FOREIGN PATENT DOCUMENTS

| | | | |
|---|---|---|---|
| JP | 4020377 | B2 | 12/2007 |
| JP | 2017-067628 | A | 4/2017 |

* cited by examiner

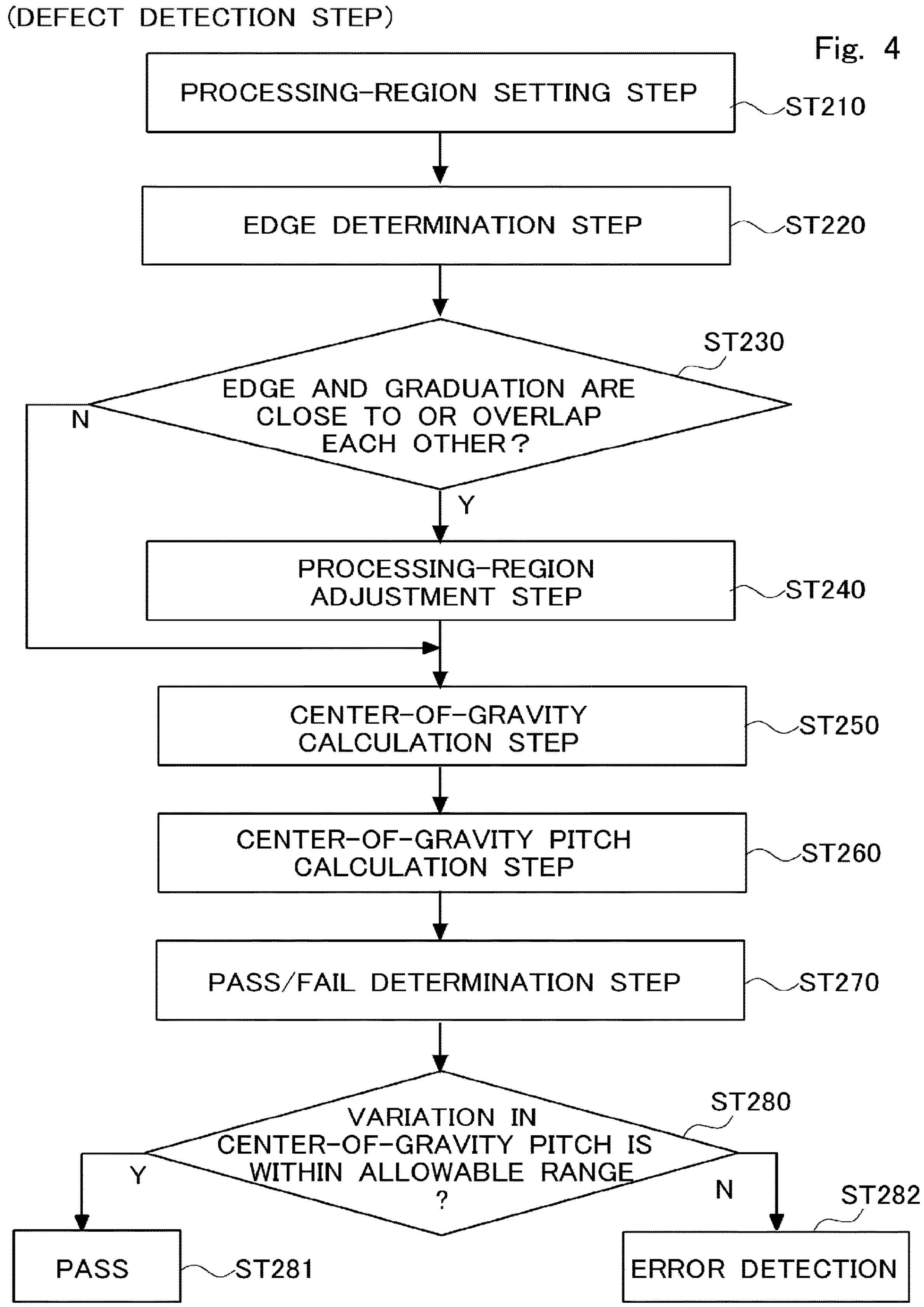
(DEFECT DETECTION STEP)
Fig. 4
PROCESSING-REGION SETTING STEP
ST210
EDGE DETERMINATION STEP
ST220
ST230
EDGE AND GRADUATION ARE CLOSE TO OR OVERLAP EACH OTHER?
N
Y
PROCESSING-REGION ADJUSTMENT STEP
ST240
CENTER-OF-GRAVITY CALCULATION STEP
ST250
CENTER-OF-GRAVITY PITCH CALCULATION STEP
ST260
PASS/FAIL DETERMINATION STEP
ST270
VARIATION IN CENTER-OF-GRAVITY PITCH IS WITHIN ALLOWABLE RANGE ?
ST280
Y
N
PASS
ST281
ERROR DETECTION
ST282

INSPECTION METHOD, INSPECTION APPARATUS, AND INSPECTION PROGRAM FOR DISK-SHAPED GRADUATION PLATE

INCORPORATION BY REFERENCE

This application is based upon and claims the benefit of priority from JP patent application No. 2022-206091, filed on Dec. 22, 2022 (DAS code E2AE), and JP Patent application No. 2023-200248, filed on Nov. 27, 2023 (DAS code 01F3), the disclosure of which is incorporated herein in its entirety by reference.

BACKGROUND OF THE PRESENT INVENTION

1. Field of the Present Invention

The present invention relates to an inspection method, an inspection apparatus, and an inspection program for a disk-shaped graduation plate.

2. Description of Related Art

Dial gauges, for example, are measuring devices that display measurement values in analog form with a circular graduation plate and a rotating pointer. Precision measuring devices such as dial gauges are inspected prior to product shipment or periodically by measuring device manufacturers or inspection agencies to assure measurement accuracy and precise calibration.

Patent Literature 1: JP 2017-067628 A
Patent Literature 2: JP S57-61165 A
Patent Literature 3: JP 2846217 B
Patent Literature 4: JP 4020377 B

SUMMARY OF THE PRESENT INVENTION

In the inspection of dial gauges, the spindle of a dial gauge to be inspected is displaced by a predetermined amount by a gauge inspection device (master measuring device), and the indication values are compared between the dial gauge to be inspected and the master measuring device to measure the indication error. However, even if a dial gauge is found to have an indication error defect in this inspection method, it has been not possible to distinguish whether the defect is caused by the internal mechanism or the display (the graduation plate or graduations).

A purpose of the present invention is to provide an inspection method, an inspection apparatus, and an inspection program for a disk-shaped graduation plate to inspect the disk-shaped graduation plate accurately and efficiently.

An inspection method for a disk-shaped graduation plate according to an exemplary embodiment of the present invention is a method of inspecting a disk-shaped graduation plate for defects, the method including:

- an image-data acquisition step of acquiring data about an image of the disk-shaped graduation plate as disk-shaped graduation-plate image data;
- a polar-coordinate transformation step of transforming the disk-shaped graduation-plate image data into polar coordinates using a center of the disk-shaped graduation plate as a reference to generate polar-coordinate graduation image data; and
- a defect detection step of detecting a defect in the disk-shaped graduation plate based on the polar-coordinate graduation image data.

In an exemplary embodiment of the present invention, it is preferable that

- the polar-coordinate transformation step includes expressing an angle parameter as a straight angle display axis to align graduations in the polar-coordinate graduation image data in parallel, and
- the defect detection step includes:
  - a processing-region setting step of setting a processing region having a width equivalent to (A°/N)×k on the angle display axis, where a center angle of a range in which the graduations are provided on the disk-shaped graduation plate is A°, the number of the graduations on the disk-shaped graduation plate is N, and k is a positive integer less than or equal to N/3;
  - a center-of-gravity calculation step of calculating a center of gravity for each processing region; and
  - a center-of-gravity pitch calculation step of calculating a pitch of the center of gravity calculated in the center-of-gravity calculation step.

In an exemplary embodiment of the present invention, it is preferable that

- k is a number greater than 1 in a first stage of inspection, and
- k is set to 1 in a second stage of detailed inspection.

In an exemplary embodiment of the present invention, it is preferable that the method further includes, before the center-of-gravity calculation step;

- an edge determination step of determining whether an edge of the processing region and a graduation are close to each other within a predetermined threshold or overlap each other; and
- a processing-region adjustment step of shifting the processing region along the angle display axis by half a width of two adjacent graduations being an amount equivalent to (A°/2N), when the edge and the graduation are determined to be close to each other within the predetermined threshold or overlap each other in the edge determination step.

In an exemplary embodiment of the present invention, it is preferable that the image-data acquisition step includes:

- acquiring data about a plurality of images of the disk-shaped graduation plate with different positions of a pointer; and
- acquire the disk-shaped graduation-plate image data from which the pointer is substantially excluded based on the plurality of image data.

In an exemplary embodiment of the present invention, it is preferable that the image-data acquisition step includes:

- averaging the data about the plurality of images to acquire the disk-shaped graduation-plate image data.

In an exemplary embodiment of the present invention, it is preferable that the image-data acquisition step includes:

- obtaining the median of luminance value for each corresponding pixel of the plurality of image data or obtaining the average value of the luminance values of several data near the median value for each corresponding pixel of the plurality of image data to acquire the disk-shaped graduation-plate image data.

An inspection apparatus for a disk-shaped graduation plate according to an exemplary embodiment of the present invention is an inspection apparatus for a disk-shaped graduation plate, the inspection apparatus including:

- an image-data acquiring unit configured to acquire data about an image of the disk-shaped graduation plate as disk-shaped graduation-plate image data;
- a polar-coordinate transforming unit configured to transform the disk-shaped graduation-plate image data into polar coordinates using a center of the disk-shaped graduation plate as a reference to generate polar-coordinate graduation image data; and a defect detecting unit configured to detect a defect in the disk-shaped graduation plate based on a pitch of graduations in the polar-coordinate graduation image data.

An inspection program for a disk-shaped graduation plate according to an exemplary embodiment of the present invention is a computer-readable recording medium storing an inspection program for a disk-shaped graduation plate, the program causing a computer to execute:

an image-data acquisition step of acquiring data about an image of the disk-shaped graduation plate as disk-shaped graduation-plate image data;

a polar-coordinate transformation step of transforming the disk-shaped graduation-plate image data into polar coordinates using a center of the disk-shaped graduation plate as a reference to generate polar-coordinate graduation image data; and a defect detection step of detecting a defect in the disk-shaped graduation plate based on a pitch of graduations in the polar-coordinate graduation image data.

An inspection method for a disk-shaped graduation plate according to an exemplary embodiment of the present invention is a method of inspecting a disk-shaped graduation plate for defects, the method including:

an image-data acquisition step of acquiring data about an image of the disk-shaped graduation plate as disk-shaped graduation-plate image data;

a polar-coordinate transformation step of transforming the disk-shaped graduation-plate image data into polar coordinates using a center of the disk-shaped graduation plate as a reference to generate polar-coordinate graduation image data; and a defect detection step for detecting a defect in the disk-shaped graduation plate by comparing a pitch of graduations in the polar-coordinate graduation image data with a predetermined reference value.

In an exemplary embodiment of the present invention, it is preferable that the polar-coordinate transformation step includes expressing an angle parameter as a straight angle linear display axis to align graduations in the polar-coordinate graduation image data in parallel, and the defect detection step includes:

a first processing-region setting step of setting a first processing region having a first width equivalent to (A°/N) on the angle linear display axis, where a center angle of a range in which the graduations are provided on the disk-shaped graduation plate is A°, and the number of the graduations on the disk-shaped graduation plate is N; and a first center-of-gravity calculation step of calculating a center of gravity for each first processing region.

In an exemplary embodiment of the present invention, it is preferable that the method further includes, before the first center-of-gravity calculation step;

an edge determination step of determining whether an edge of the first processing region and a graduation are close to each other within a predetermined threshold or overlap each other; and a processing-region adjustment step of shifting the first processing region along the angle linear display axis by half a width of two adjacent graduations being an amount equivalent to (A°/2N), when the edge and the graduation are determined to be close to each other within the predetermined threshold or overlap each other in the edge determination step.

In an exemplary embodiment of the present invention, it is preferable that the method further includes:

a second processing-region setting step of setting, for each center of gravity calculated in the first center-of-gravity calculation step, a second processing region having a width narrower than the first processing region; and a second center-of-gravity calculation step of calculating a center of gravity for each second processing region.

In an exemplary embodiment of the present invention, it is preferable that the image-data acquisition step includes:

acquiring data about a plurality of images of the disk-shaped graduation plate with different positions of a pointer; and acquire the disk-shaped graduation-plate image data from which the pointer is substantially excluded based on the plurality of image data.

In an exemplary embodiment of the present invention, it is preferable that the image-data acquisition step includes:

averaging the data about the plurality of images to acquire the disk-shaped graduation-plate image data.

In an exemplary embodiment of the present invention, it is preferable that the image-data acquisition step includes:

obtaining the median of luminance value for each corresponding pixel of the plurality of image data or obtaining the average value of the luminance values of several data near the median value for each corresponding pixel of the plurality of image data to acquire the disk-shaped graduation-plate image data.

A defect inspection apparatus for a disk-shaped graduation plate according to an exemplary embodiment of the present invention, the apparatus includes:

an image-data acquiring unit configured to acquire data about an image of the disk-shaped graduation plate as disk-shaped graduation-plate image data;

a polar-coordinate transforming unit configured to transform the disk-shaped graduation-plate image data into polar coordinates using a center of the disk-shaped graduation plate as a reference to generate polar-coordinate graduation image data; and a defect detecting unit configured to detect a defect in the disk-shaped graduation plate by comparing a pitch of graduations in the polar-coordinate graduation image data with a predetermined reference value.

An inspection program for a disk-shaped graduation plate according to an exemplary embodiment of the present invention is a computer-readable recording medium storing an inspection program for a disk-shaped graduation plate, the program causing a computer to execute:

an image-data acquisition step of acquiring data about an image of the disk-shaped graduation plate as disk-shaped graduation-plate image data;

a polar-coordinate transformation step of transforming the disk-shaped graduation-plate image data into polar coordinates using a center of the disk-shaped graduation plate as a reference to generate polar-coordinate graduation image data; and a defect detection step of detecting a defect in the disk-shaped graduation plate by comparing a pitch of graduations in the polar-coordinate graduation image data with a predetermined reference value.

BRIEF DESCRIPTION OF THE DRAWINGS

FIG. 4 is a flowchart for explaining the operation in a defect detection step;

DETAILED DESCRIPTION

Figure 1:
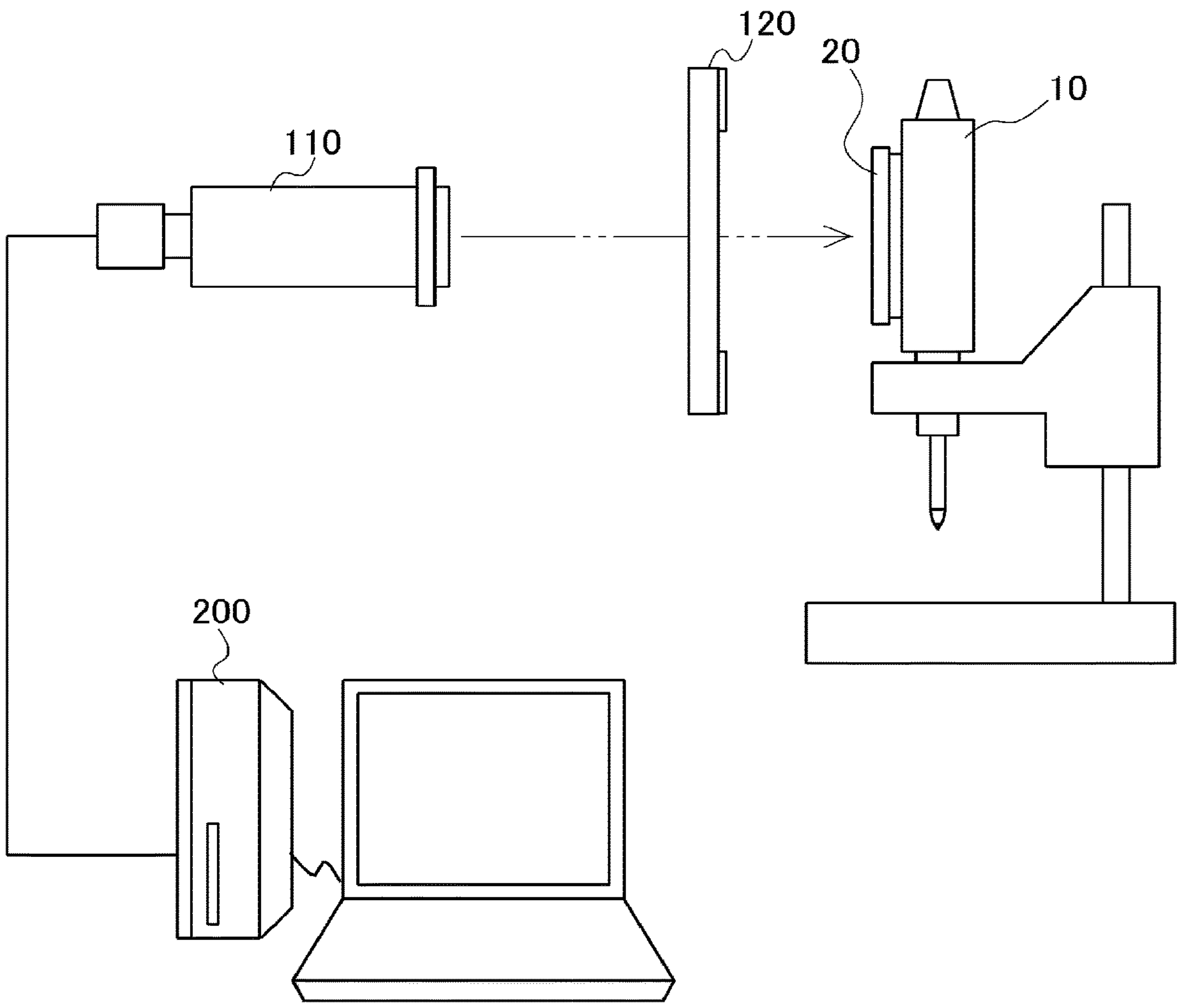
FIG. 1 is a diagram showing a system configuration of a measuring-device inspection apparatus according to a first exemplary embodiment.

Embodiments of the present invention are illustrated and described with reference to the reference signs assigned to the elements in the drawings.

First Exemplary Embodiment

A measuring-device inspection apparatus according to a first exemplary embodiment of the present invention is described below.

The measuring-device inspection apparatus inspects a measuring device that displays a measurement value in analog form with, for example, a disk-shaped graduation plate and a rotating pointer such as a (analog display type) dial gauge 10. (Dial gauges can be referred to as indicators or test indicators.)

Precision measuring devices such as dial gauges are periodically inspected by measuring device manufacturers or inspection agencies to assure measurement accuracy and precise calibration. The measuring-device inspection apparatus according to the present exemplary embodiment mainly inspects a disk-shaped graduation plate for defects, such as distortion of the graduation plate, blurring of the graduations, scratches, dirt, and the like.

FIG. 1 is a diagram showing a system configuration of the measuring-device inspection apparatus.

A measuring-device inspection apparatus 100 includes a camera 110 as an imaging means (image sensor) and an arithmetic processing device 200.

The camera 110 is installed to capture images of a graduation plate 20 of a measuring device 10 to be inspected from the front. In order to prevent uneven luminance due to shadows, a ring illumination 120 is preferably installed.

The arithmetic processing device 200 is typically a small computer with a keyboard, a mouse, a microphone, a display, a printer, and a speaker built into or external to the computer as input/output devices. Alternatively, the arithmetic processing device 200 may be a tablet device or a smart phone (portable high-performance phone).

Figure 2:
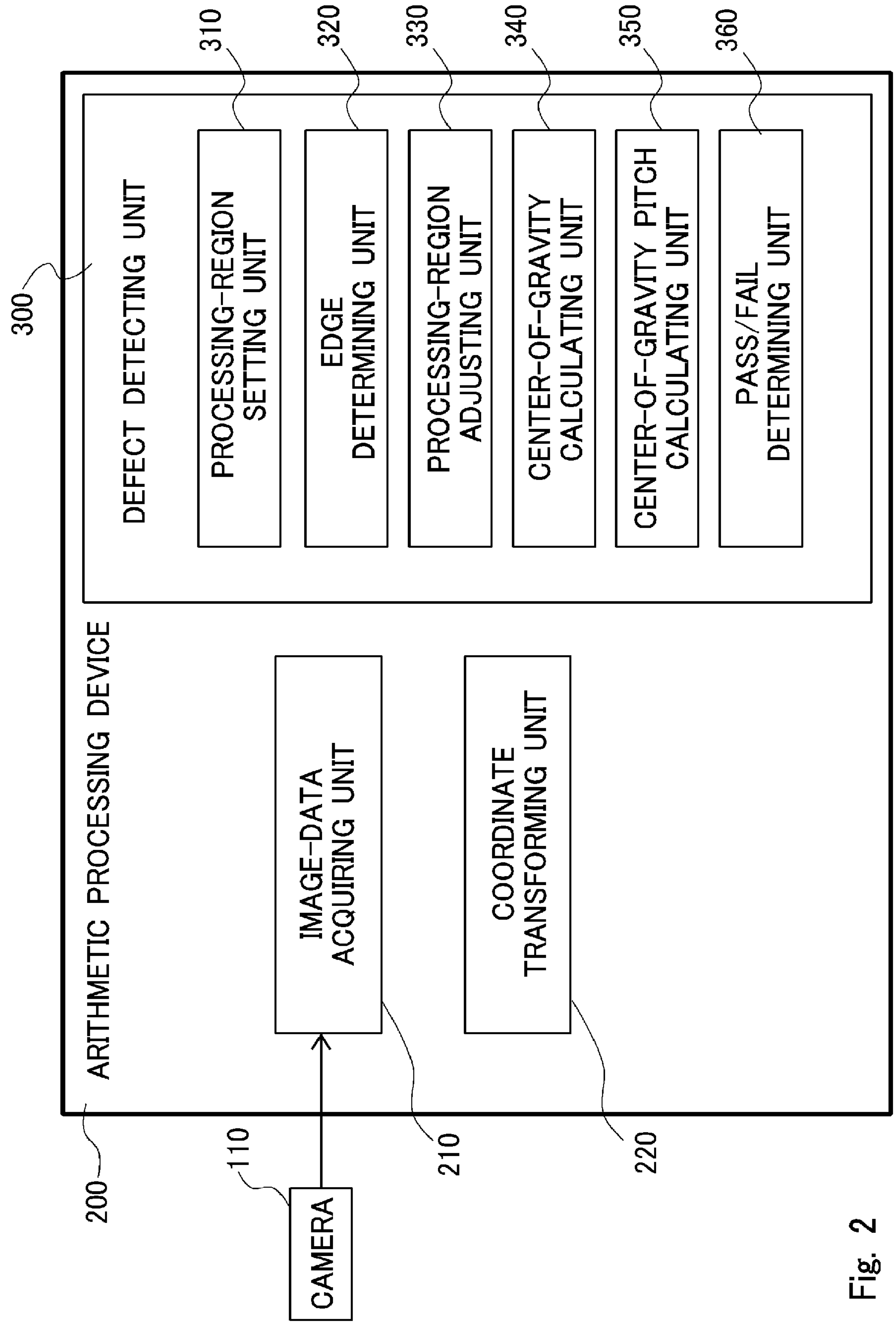
FIG. 2 is a functional block diagram of an arithmetic processing device.

FIG. 2 is a functional block diagram of the arithmetic processing device 200.

The arithmetic processing device 200 includes a central processing unit (CPU), a memory (ROM, RAM), and the like, and performs functions of functional units by the CPU executing an inspection program. The inspection program may be distributed by being recorded on a non-volatile recording medium (a CD-ROM, a memory card, or the like) or by being downloaded via an Internet connection or the like.

The arithmetic processing device 200 includes an image-data acquiring unit 210, a coordinate transforming unit 220, and a defect detecting unit 300.

The defect detecting unit 300 includes a processing-region setting unit 310, an edge determining unit 320, a processing-region adjusting unit 330, a center-of-gravity calculating unit 340, a center-of-gravity pitch calculating unit 350, and a pass/fail determining unit 360.

The operation of each functional unit will be described later with reference to flowcharts.

Figure 3:
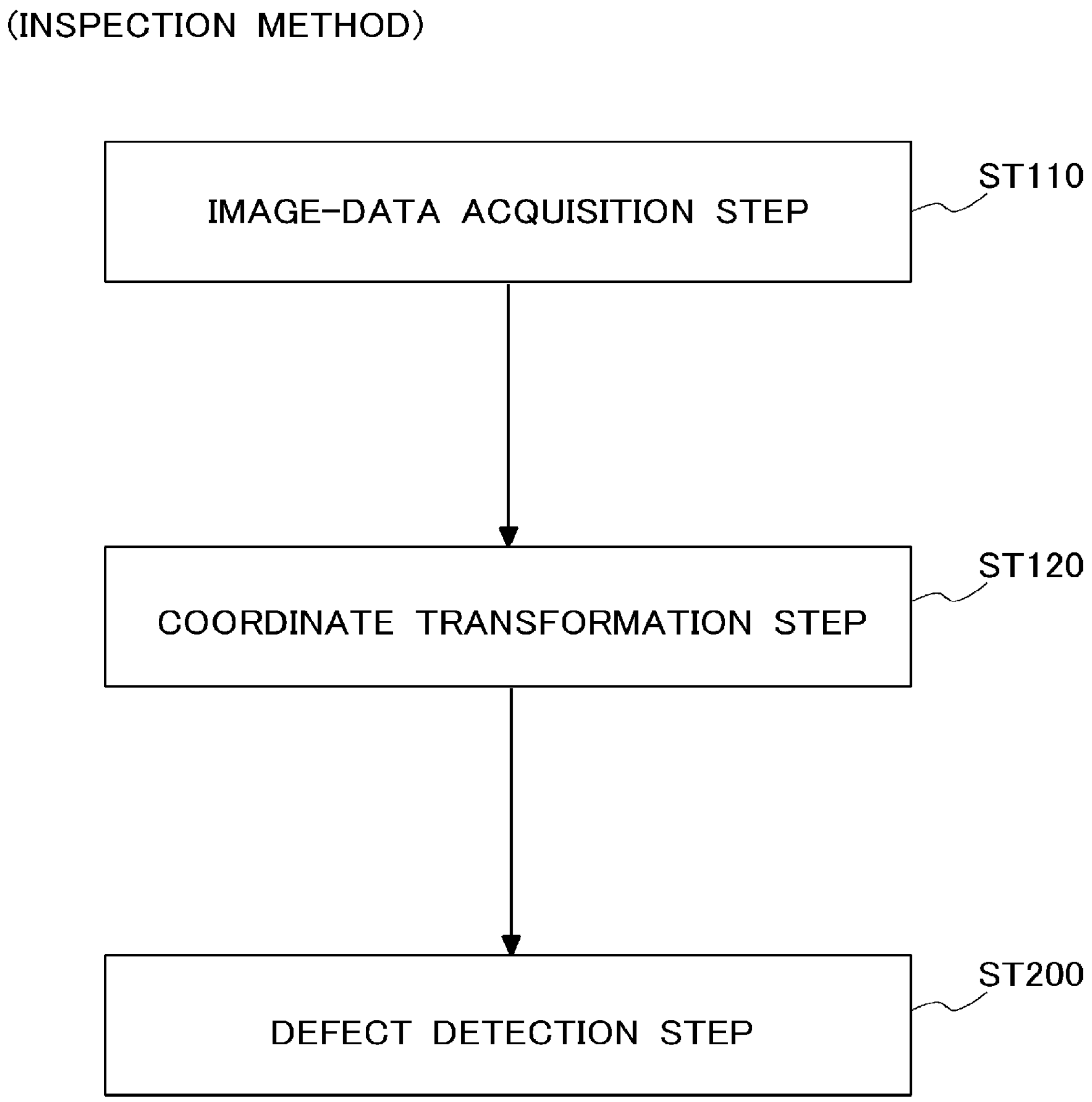
FIG. 3 is a flowchart for explaining the operation in a defect inspection method for a disk-shaped graduation plate according to the first exemplary embodiment.

FIG. 3 is a flowchart for explaining the operation in a defect inspection method for a disk-shaped graduation plate according to the first exemplary embodiment.

An operator installs a measuring device to be inspected on a stand in such a manner that the analog display (graduation plate) of the measuring device is directly facing the camera 110. The camera (image sensor) 110 captures an image of the graduation plate 20 of the measuring device, and the data about the image is transmitted to the image-data acquiring unit 210.

Here, the analog display of the measuring device includes a graduation plate 20 and a pointer 30, but the graduation plate 20 is inspected in the present exemplary embodiment. Therefore, an image of only the graduation plate 20 excluding the pointer 30 is captured. Thus, a plurality of images is captured while the position of the pointer 30 is changed to acquire data about the images.

Figure 5:
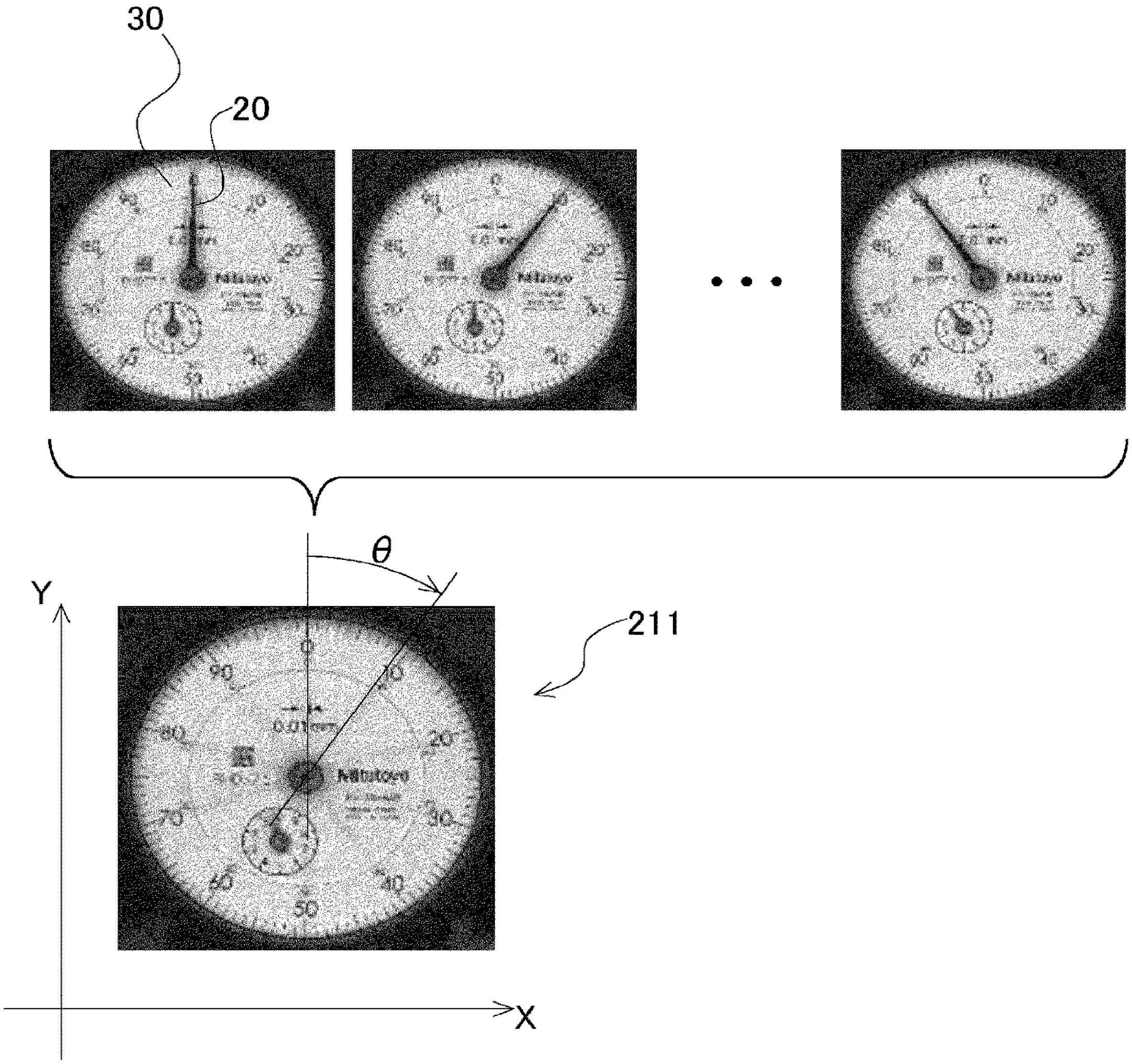
FIG. 5 is a diagram showing an example of data about an image of the disk-shaped graduation plate.

As shown in FIG. 5, the data about the images is acquired for one rotation of the pointer 30 while the pointer 30 is rotated by a predetermined angle. The images are superimposed to average the luminance value for each corresponding pixel. (luminance value is, for example, a gradation scale value of the luminance (brightness) of a pixel, and is also called, for example, a pixel value.) Then, the effect of the presence of the pointer 30 is diminished, and the data about the images of only the graduation plate 20, from which the pointer 30 is substantially excluded, is acquired (an image-data acquisition step ST110). This data is referred to as disk-shaped graduation-plate image data 211.

Alternatively, a plurality of the analog display image with changing the position of the pointer 30 are captured and, the median value of luminance values for each corresponding pixel may be obtained. Using the plurality of the analog display image, the luminance values of each corresponding pixel are arranged in ascending or descending order, and the median value is determined as the luminance of each pixel.

Instead of the median value itself, several average values near the median value may be used as the luminance value of the pixel. (To obtain the average near the median, extract an appropriate number of luminance values near the median, such as 2, 3, 4, or 5 points near the median, and use those luminance values. Alternatively, the number of luminance values near the median value used to calculate the average may be less than half, less than one-third or less than one-fourth of the number of captured image data.) The method of overlapping multiple image data and averaging the luminance values for each corresponding pixel is simple and requires relatively light calculation burden, but there is a concern that the contrast may decrease. In this regard, when using the median value of each corresponding pixel of multiple image data (or the average value of several points near the median value), the influence of the pointer is completely eliminated and image data of only the scale plate 40 with high contrast can be obtained. Since inspected object is a scale plate, it is important to first obtain high-quality scale plate image data.

Next, the coordinate transforming unit 220 transforms the disk-shaped graduation-plate image data 211 into polar coordinates.

Here, the center of the graduation plate 20 (rotation center of the pointer 30) is the reference point (origin) of the polar coordinates, and the clockwise direction is the positive rotation direction.

The axis with zero angle (θ) is determined as appropriate. Here, the axis with zero angle (θ) is the direction parallel to the y-axis with a larger y-coordinate when the disk-shaped graduation-plate image data 211 is viewed in two-dimensional Cartesian coordinates (x, y).

If the measuring device (dial gauge) is installed on the stand in the normal vertical posture, the line from the center of the graduation plate toward "0" on the graduations is the axis with zero angle. However, since the graduation plate 20 of the measuring device (dial gauge) is rotatable, the graduations can or cannot be on the axis with zero angle (θ).

Then, the data about the images is transformed in such a manner that the angle parameter θ is expressed as a straight horizontal axis. This data is referred to as polar-coordinate graduation image data 221.

Figure 6:
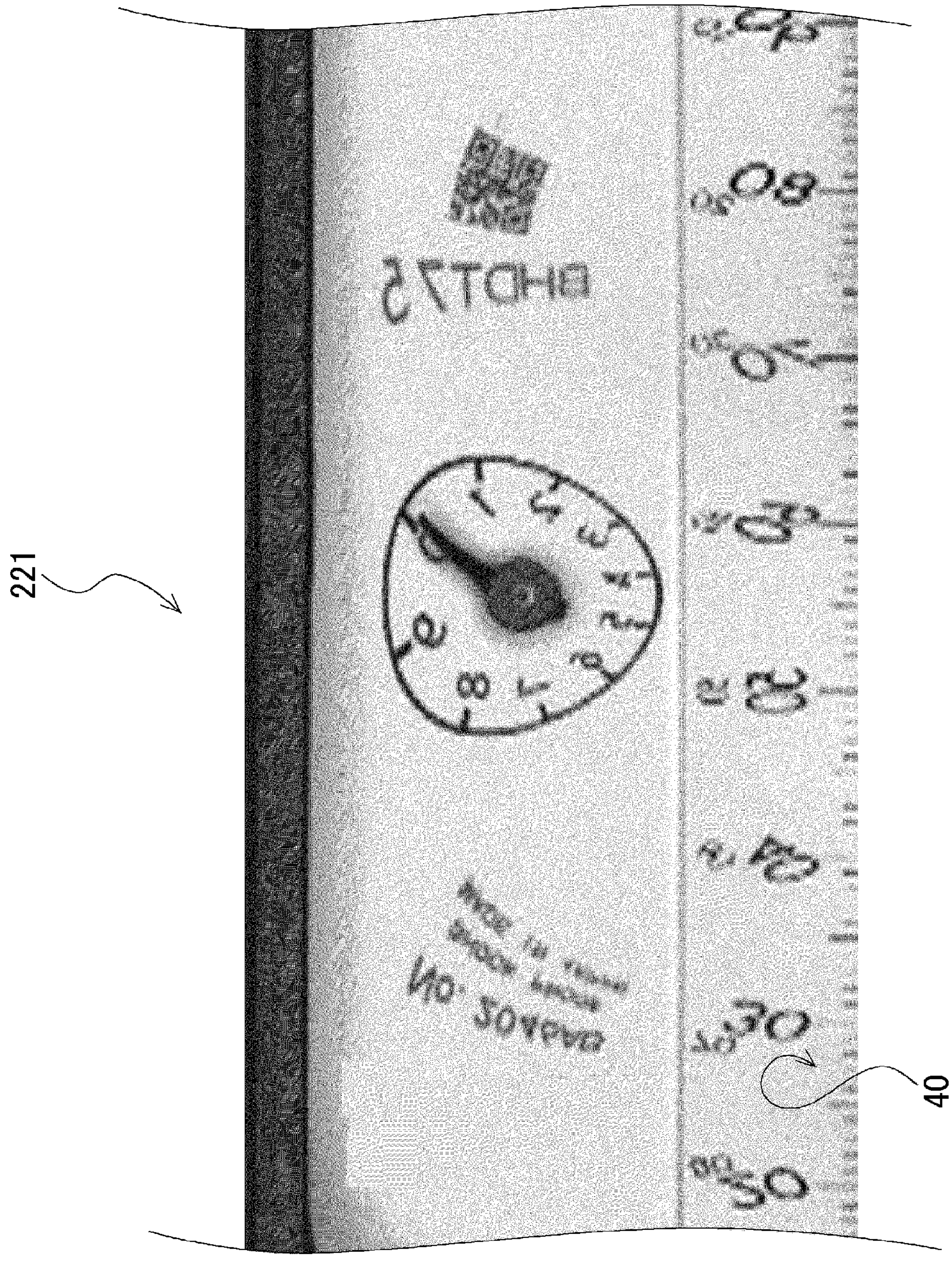
FIG. 6 is a diagram showing an example of polar-coordinate graduation image data.

FIG. 6 is a diagram showing an example of the polar-coordinate graduation image data 221.

In the polar-coordinate graduation image data 221, the graduations 40 are parallel to each other and aligned along the horizontal axis. The straight horizontal axis corresponding to the angle parameter θ is referred to as an angle display axis. The angle display axis is equivalent to 0° to 360°. In plotting the angle parameter θ on the angle display axis, a length (or the number of pixels) equivalent to 1° of angle θ is set as appropriate. Here, the length equivalent to 1° of angle θ is 1 mm.

Note that there are several possible methods for determining the center of the graduation plate 20 in the disk-shaped graduation-plate image data 211.

Figure 7:
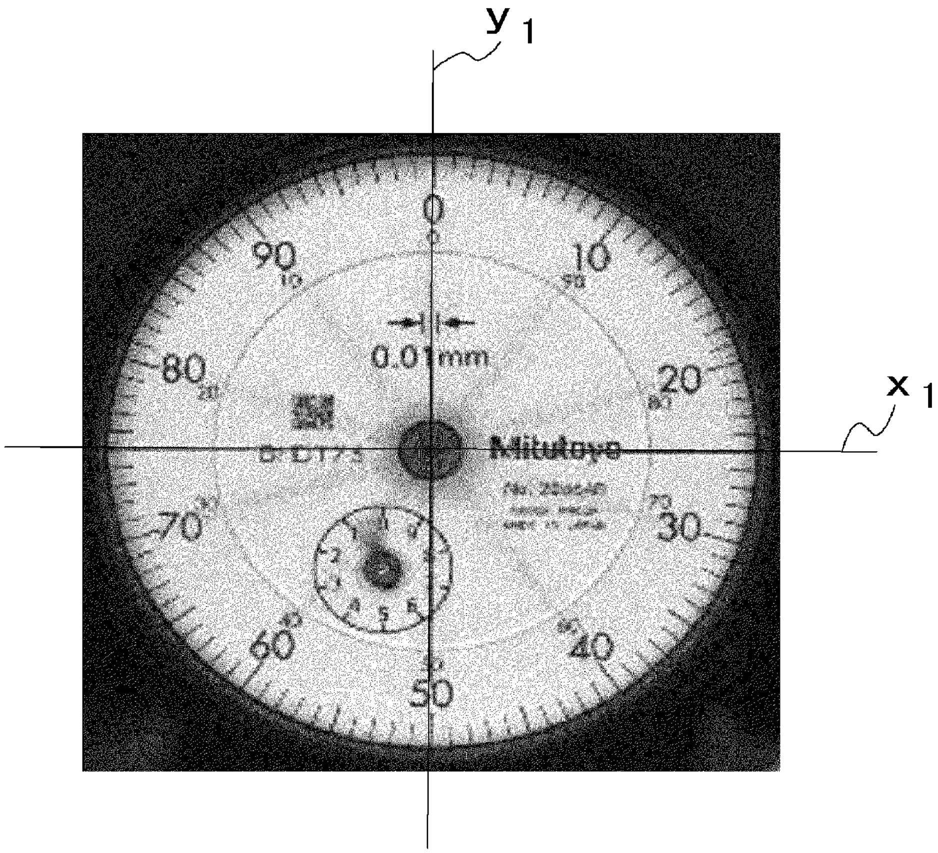
FIG. 7 is a diagram showing an example of a procedure for calculating the center of the disk-shaped graduation plate.

For example, by detecting two graduations parallel to the y-axis in the disk-shaped graduation-plate image data 211 in two-dimensional Cartesian coordinates (x, y), a 0° graduation and a 180° graduation are found. The straight line connecting the 0° graduation and the 180° graduation is referred to as a y1 line (FIG. 7). Similarly, by detecting two graduations parallel to the x-axis in the disk-shaped graduation-plate image data 211 in two-dimensional Cartesian coordinates (x, y), a 90° graduation and a 270° graduation are found. The straight line connecting the 90° graduation and the 270° graduation is referred to as an x1 line.

The intersection of the y1 line and the x1 line is determined as the center of the graduation plate 20 (FIG. 7).

In order to increase the accuracy or precision of the inspection, the disk-shaped graduation-plate image data 211 may be converted to the sub-pixel level by interpolation (for example, bilinear interpolation) to refine the sampling pitch of the angle θ.

Next, a defect detection step (ST200) is described.

FIG. 4 is a flowchart for explaining the operation in the defect detection step (ST200).

First, the processing-region setting unit 310 sets the size (magnitude) of a processing region 311, which is a region of interest (ROI) for defect detection. For the size of the processing region 311, if each graduation is processed one by one, the size (width) of the processing region 311 is set to the width of two adjacent graduations. For example, if there are 100 graduations, the size (width) of the processing region 311 is set to a width equivalent to 360°/100=3.6°. For example, if the width of 1° is 1 mm on the angle display axis, the size (width) of the processing region 311 is 3.6 mm.

The number of graduations N on the disk-shaped graduation plate 20 to be inspected may be automatically counted by the arithmetic processing device 200 using image recognition from the data about the images captured by the camera 110. Alternatively, the number of graduations may be set and input to the arithmetic processing device 200 by the operator in advance. In addition, the number of graduations may be read from the model number of the measuring device, the model number of the graduation plate, or a bar code (one-dimensional or two-dimensional bar code) on the measuring device or graduation plate.

In the present exemplary embodiment, in order to increase inspection efficiency, first, each 10 (k=10) of the graduations are used as a processing unit. For example, if there are 100 graduations (N=100), the size (width) of the processing region 311 is set to a width equivalent to 360°/100×10=36°. If the width for 1° is 1 mm on the angle display axis, the size (width) of the processing region 311 is 36 mm.

The height of the processing region 311 is not particularly limited, and is set appropriately according to the length of the graduations. If the height of the processing region 311 is too large, an extra region other than the graduations is surrounded, and the height of the processing region 311 may be about the same as the length of the graduations or slightly shorter than the length of the graduations. Needless to say, the height of the processing region 311 may be longer than the length of the graduations.

Then, the processing region 311 is arranged on the polar-coordinate graduation image data 221 (a processing-region setting step ST210).

Figure 8:
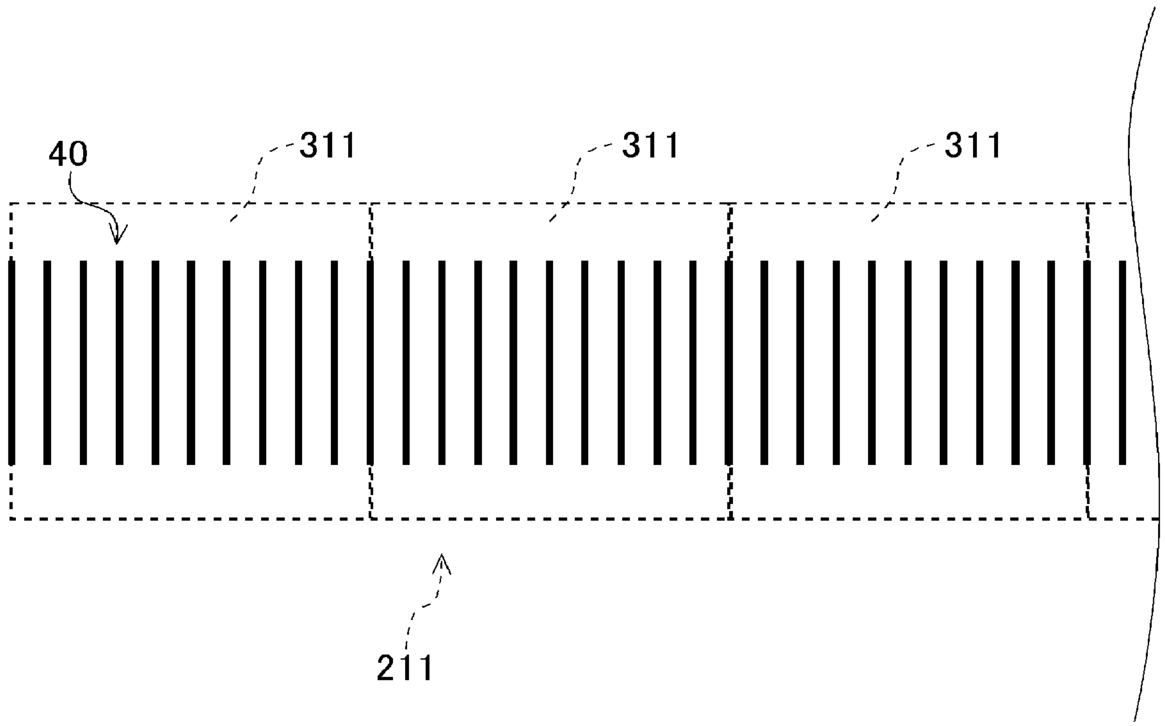
FIG. 8 is a diagram showing, as an example, that a processing region is arranged (mapped) along an angle display axis of the polar-coordinate graduation image data.

FIG. 8 is a diagram showing, as an example, that the processing regions 311 are arranged (mapped) along the angle display axis of the polar-coordinate graduation image data 221. Here, the processing regions 311 do not overlap each other with no gaps between adjacent processing regions, and divide the polar-coordinate graduation image data 221 along the angle display axis.

Thereafter, the graduations are to be inspected by calculating the center of gravity for each processing region 311, but if the graduations 40 and the edges of the processing regions 311 overlap or are too close to each other, the center of gravity cannot be calculated correctly. Therefore, the edge determining unit 320 determines whether the edges of the processing regions 311 and the graduations 40 are close to each other within a predetermined threshold (an edge determination step ST220). The threshold for this edge determination is an edge determination threshold.

Figure 9:
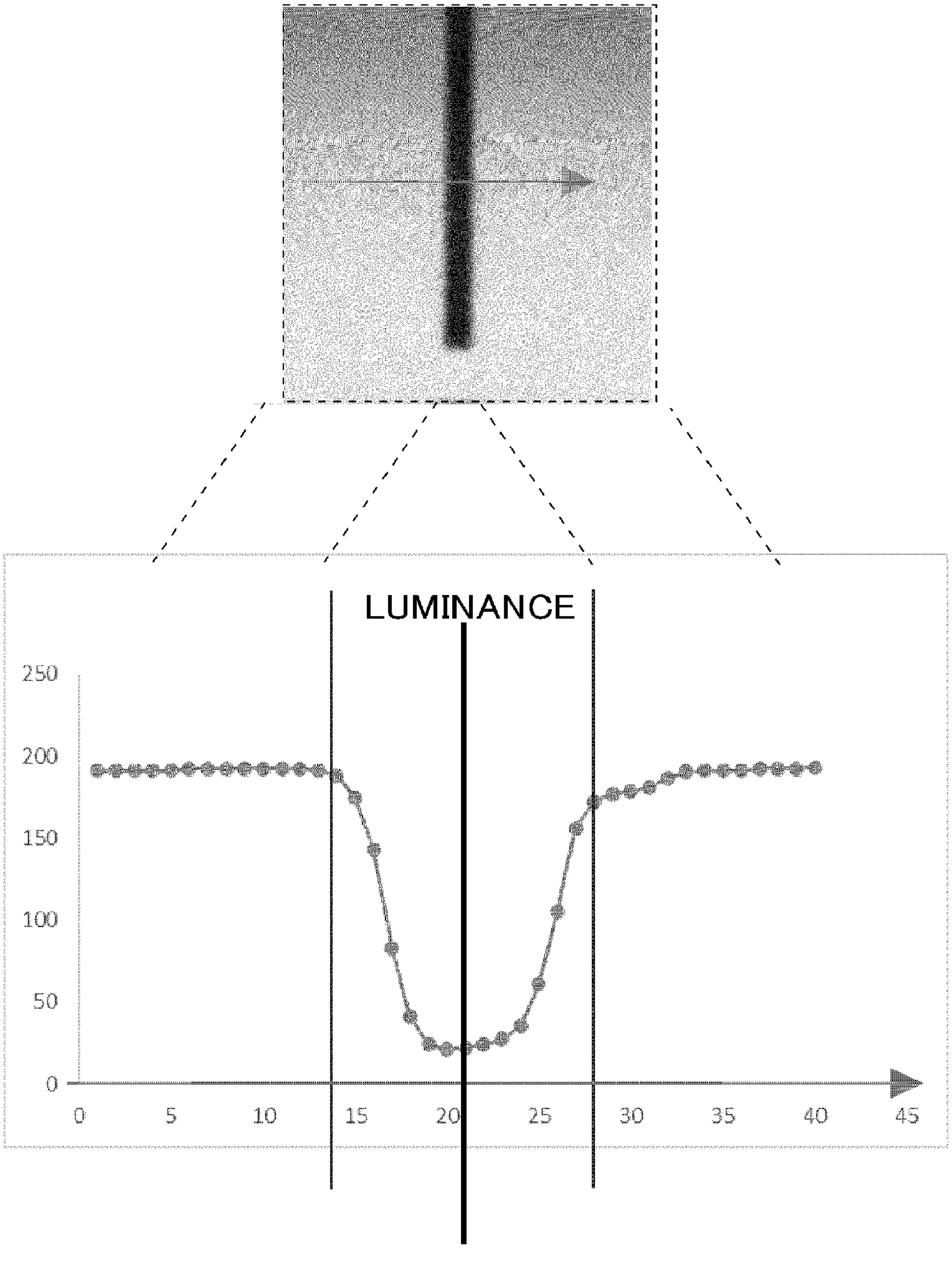
FIG. 9 is a diagram showing that a graduation is detected.

The edge determination step (ST220) does not need to be performed on all of the mapped processing regions 311, but only on the left edge of any one processing region 311, for example, the leftmost processing region 311. By focusing on the left edge of the leftmost processing region 311 and sampling the luminance for several pixels (for example, edge determination threshold) on either side of this edge, it is determined whether a graduation 40 is in the vicinity of the edge. As shown in FIG. 9, if there is a region with a series of points (pixels) whose luminance is less than a predetermined value when the luminance is sampled in the vicinity of the edge, the edge of the processing region 311 and the graduation 40 are determined to be too close (ST230: YES).

Figure 10:
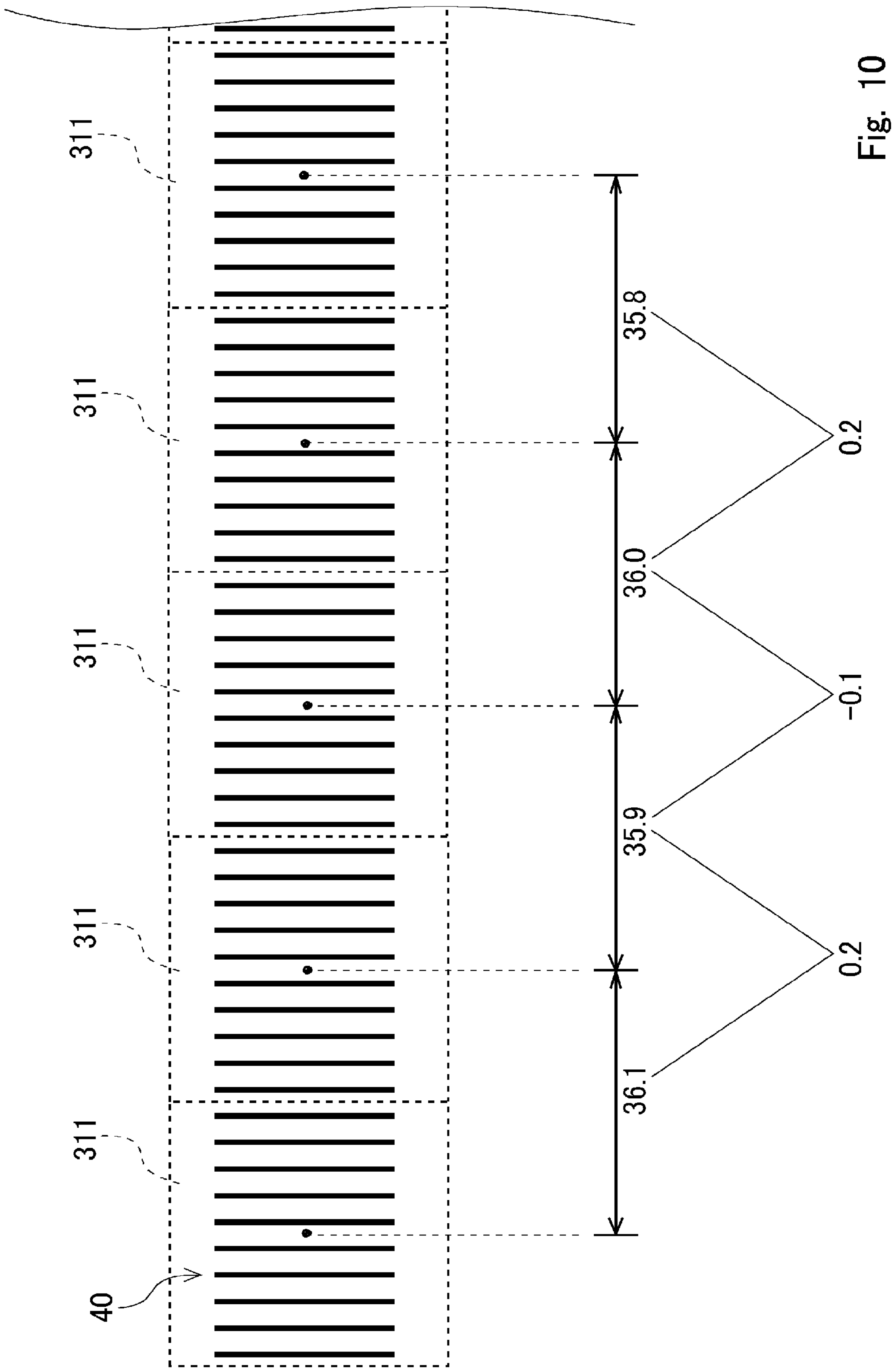
FIG. 10 is a diagram showing a state after the arrangement (mapping) of the processing regions 311 is adjusted.

When the edge of the processing region 311 and the graduation 40 are too close to each other (ST230: YES), the arrangement of the processing regions 311 is adjusted (a processing-region adjustment step ST240). In other words, the processing regions 311 are shifted along the angle display axis by half the width of two adjacent graduations, that is, by an amount equivalent to (360°/2N). FIG. 10 is a diagram showing an example of a state after the arrangement (mapping) of the processing regions 311 is adjusted.

Here, in the present exemplary embodiment, if the edge detection is performed on the edge of one processing region 311 and the edge of the processing region 311 overlaps a graduation 40, it can be considered that the overlap between the edge and the graduation is eliminated in all the processing regions 311 by shifting all the processing regions 311 by half a pitch (360°/2N) of two adjacent graduations. This is because the inspection object in the present exemplary embodiment is a disk-shaped graduation plate.

For example, in the case of a long straight linear scale, the errors in the graduation interval accumulate, and even if the entire scale is shifted by half a pitch to correct the overlap between the edge and graduation in one processing region, it cannot be said that there is no overlap between the edge and graduation in another processing region that is distant from that region.

On the other hand, in the case of the graduations 40 marked to divide a 360° circumference into N equal parts, for example, it can be said that if there is a deviation in which the graduation interval is wider or narrower in any part, the deviation is eliminated in any part, and the deviation in graduation interval does not accumulate over a half pitch or more.

Next, the center-of-gravity calculating unit 340 calculates the position of the center of gravity for each processing region 311 (a center-of-gravity calculation step ST250).

If the terms "center of gravity" or "luminance center of gravity" are inappropriate, they may be replaced by "centroid" or "luminance centroid".

A typical example of What these mean is $\Sigma[x \cdot I(x)]/\Sigma I(x)$.

x: pixel position in region

I(x): luminance (brightness or pixel) value at pixel position x

Various processing methods for calculating the luminance center of gravity in an image are known.

Since the graduation plate 20 generally has black graduations engraved or printed on a white background, it is conceivable (depending on the calculation formula to be used) to calculate the center of gravity of the black color of the graduations, dirt, scratches, and the like, excluding the (white) background, after inverting the polar-coordinate graduation image data 221 to light and dark. In addition, the polar-coordinate graduation image data 221 may be binarized to black and white at a predetermined threshold before the center-of-gravity calculation.

Based on the center-of-gravity position calculated for each processing region 311, a center-of-gravity pitch is calculated (a center-of-gravity pitch calculation step ST260). (In calculating the pitch of the center of gravity position, the distance between adjacent centers of gravity in the direction parallel to the angle display axis is calculated.)

The pass/fail determining unit 360 determines whether the pitch variation in the center of gravity position calculated for each processing region 311 is within an allowable range (a pass/fail determination step ST270).

If there are no dirt or scratches on the graduations and no distortion of the graduation plate, the centers of gravity positions of each 10 graduations are aligned at almost equal intervals, as shown in FIG. 10. In this case, the pitch variation in the center of gravity position is within the allowable range (within plus or minus a) (ST280:YES, ST281).

Figure 11:
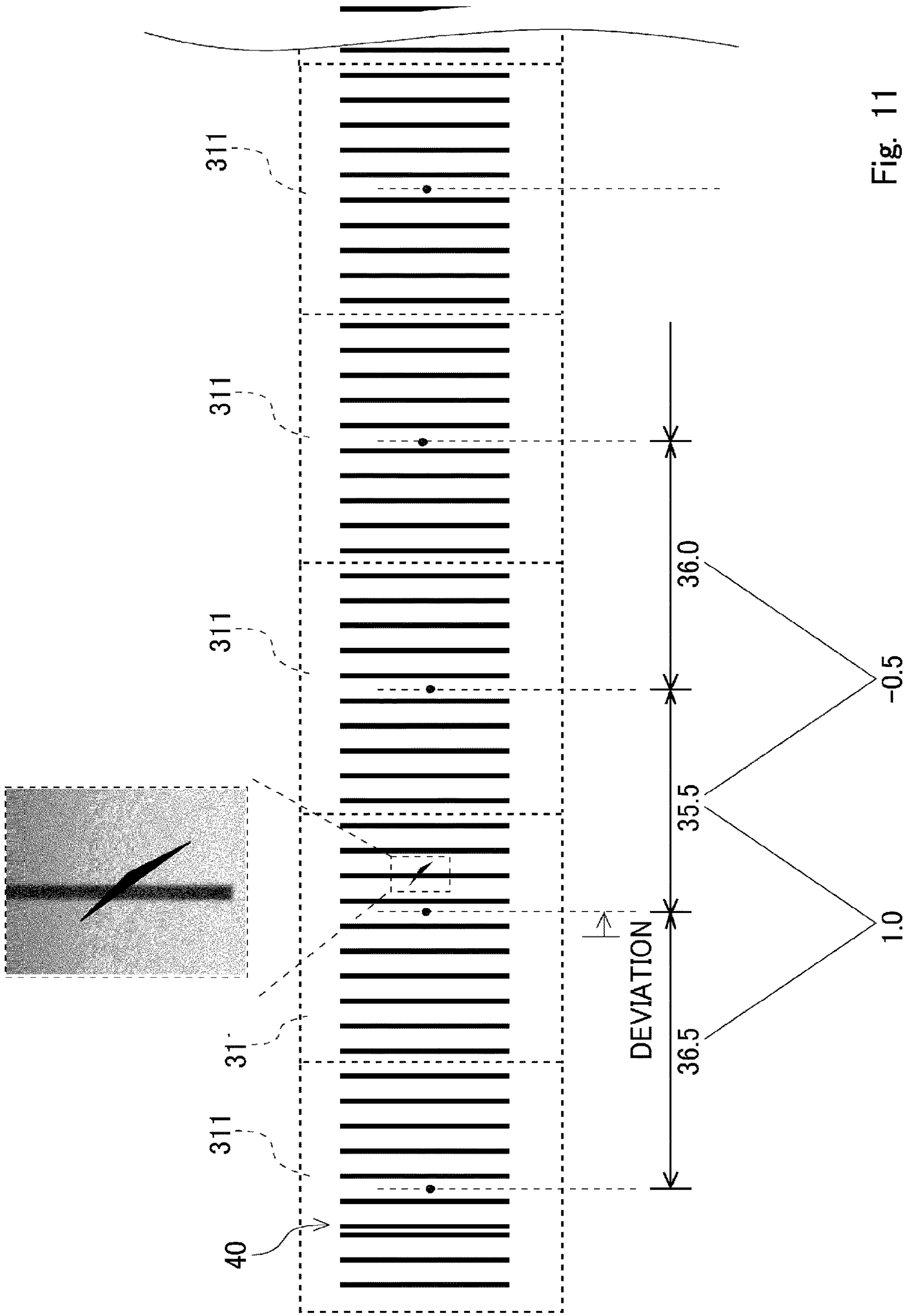
FIG. 11 is a diagram showing an example of a case in which there is a scratch or the like on the graduations (or the surface of the graduation plate)

On the other hand, as shown in FIG. 11, if there are scratches, dirt, or blurring on the graduations (or the surface of the graduation plate) or if there is distortion or flexure of the graduation plate, the center of gravity is displaced. Then, the interval (pitch) between adjacent centers of gravity largely varies. In other words, since the pitch variation in the center of gravity position calculated for each processing region 311 exceeds the allowable range (ST280: No), a defect in the graduation plate is detected in this case (error detection ST282).

If a defect (error) is detected (ST282), the arithmetic processing device 200 alerts the operator and displays an enlarged image of the region in which the defect (error) is detected on the monitor, for example. This allows the operator to visually confirm the abnormality (scratches or dirt on the graduation plate) and take appropriate measures.

According to the first exemplary embodiment, the following effects are achieved.

Conventionally, in the inspection of measuring devices, the accuracy of a measuring device to be inspected has been checked by detecting errors in the indication values between the measuring device to be inspected and a master measuring device. In this inspection method, even if it has been possible to detect a large error in the measuring device to be inspected, it has not been possible to distinguish whether the measurement error is caused by an internal mechanism or a defect in the display (graduation plate).

In this regard, the measuring-device inspection apparatus (inspection method for a disk-shaped graduation plate) can determine whether the graduation plate is defective or not. As long as it can be identified that the measurement error is caused by a defect (scratch, dirt, blurring, distortion, flexure, or the like) in the graduation plate or graduations, the problem can be quickly resolved by reattaching, cleaning, or replacing the graduation plate.

In recent years, to cope with labor shortages, the measurement value of a pointer-type analog display can be automatically read by image recognition. Even if there are minor scratches or dirt on the graduation plate 20 or the graduations 40 that cannot be recognized by the human eye, these can lead to reading errors in image recognition, resulting in measurement and calibration errors. In this regard, with the present exemplary embodiment, it is possible to prevent reading errors by inspecting the graduation plate 20 or the graduations 40 for defects.

In the present exemplary embodiment, the processing regions 311 each having a predetermined size are mapped along the angle display axis, and defects in the graduation plate 20 or the graduations 40 are detected based on the pitch variation in the center of gravity calculated for each processing region 311. This method has the advantage of being simpler, less computational load, and faster than, for example, inspecting each individual graduation for defects (scratches, dirt, blurring) by image recognition.

In mapping the processing regions 311, which are regions of interest (ROI), on the angle display axis, the processing regions 311 are arranged without overlapping each other and without gaps between adjacent processing regions, and if there is an inconvenience of overlap between an edge and a graduation, all of the processing regions 311 are shifted by half a pitch of two adjacent graduations to eliminate the overlap. In this manner, setting the image processing regions (ROI) also leads to a reduction in the computational load. For example, it is not necessary to check the overlap between a graduation and the edge for each image processing region (ROI) in advance. This is a devise of the present exemplary embodiment that focuses on the characteristics of the graduations on the disk-shaped graduation plate.

(First Modification)

In the first exemplary embodiment, the processing regions 311 are arranged to calculate the centers of gravity for each multiple (10) graduations at a time. The width of the processing region 311 may be set to the same as the pitch of the graduations 40 (360/N) to calculate the center of gravity for each graduation 40.

In a first stage of inspection, multiple (10) graduations 40 may be inspected at a time as described above, and in a second stage of detailed inspection, a processing region 311 may be arranged for each graduation 40 to calculate the center of gravity.

Since obvious defects can be identified in the first step, this leads to significant time savings, considering that a number of measuring devices are inspected. The possibility of batch processing is another advantage of the present exemplary embodiment.

In the first exemplary embodiment, the case of batch processing for 10 graduations (k=10) at a time is described as an example. However, considering that defects in the graduations are determined based on the pitch variation in the center of gravity of the processing regions 311, it is sufficient to arrange at least three processing regions 311. Therefore, the number of graduations (k) surrounded by one processing region 311 in batch processing is less than N/3. It is more preferable that k is less than N/3 and k is a divisor of N.

In another expression, k=[N/M], where M is an integer of 3≤M≤N, and [x] is the Gaussian symbol (floor function) for the largest integer that does not exceed x.

In yet another expression, there are three or more processing regions that evenly divide the angular range A to be inspected, and each processing region surrounds the same number of graduations equally.

Second Exemplary Embodiment

In the first exemplary embodiment, it is assumed that measuring devices (dial gauges) used by users are periodically inspected by measuring device manufacturers or inspection agencies.

As a second exemplary embodiment, an inspection method suitable for measuring device manufacturers to perform final inspection prior to product shipment is described.

In inspections prior to product shipment, a graduation plate 20 is inspected with the graduation plate 20 assembled to the display of a measuring device (dial gauge).

Since the parts of the graduation plate 20 have been inspected before the assembling, there should be no major scratches or dirt on the surface of the graduation plate 20, but the graduation plate 20 cannot be fitted tightly when assembled or the graduation plate 20 can be distorted or flexed due to the accumulated individual differences of the parts. As a result, the graduations cannot be evenly spaced when the graduation plate 20 is viewed from the front. In any case, in terms of product quality assurance, it is most desirable to inspect at the final stage before shipment whether the analog display (graduation plate), which is the part that users observe the most when using the measuring device, is as accurate as intended.

Figure 12:
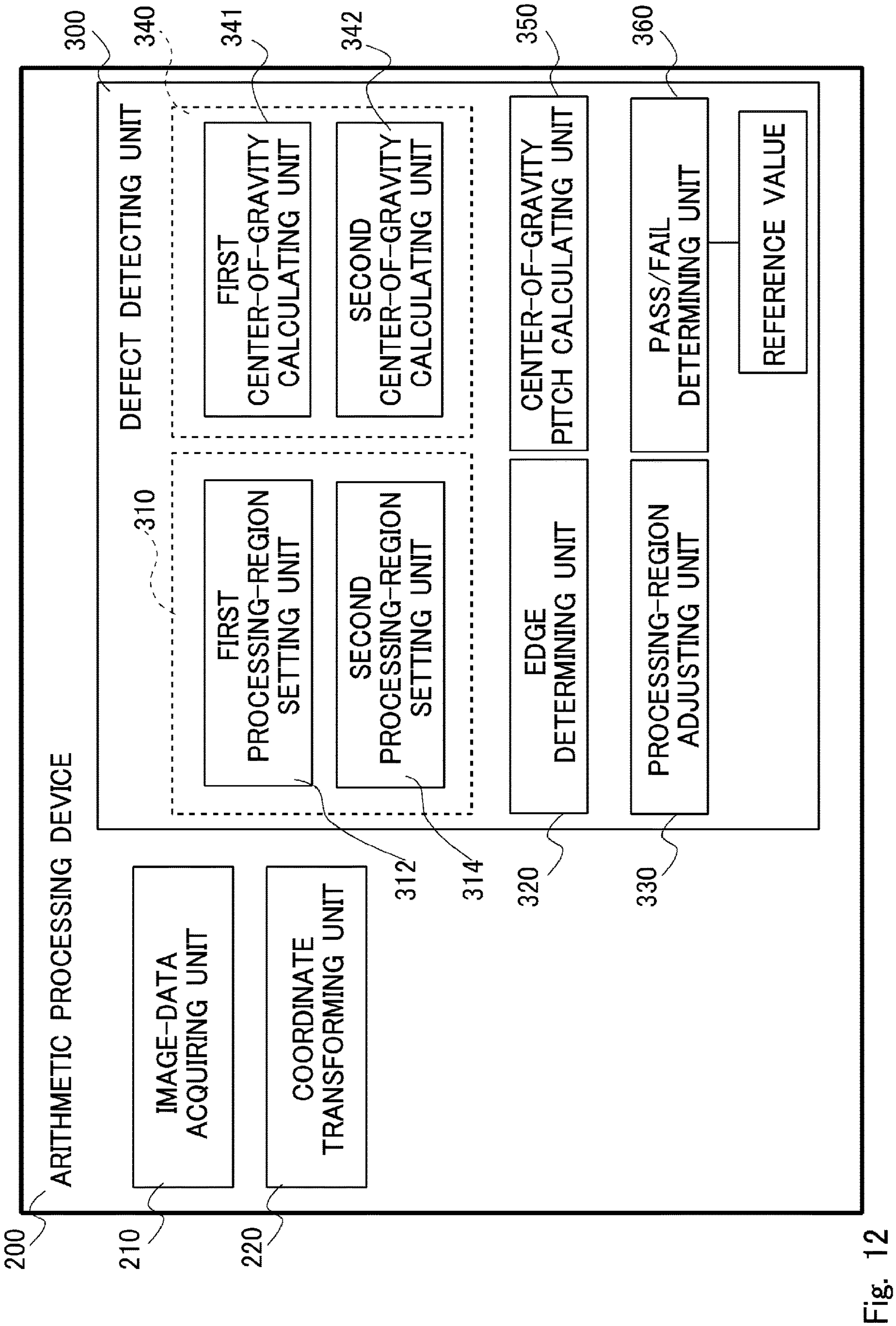
FIG. 12 is a functional block diagram of an arithmetic processing device of a measuring-device inspection apparatus according to a second exemplary embodiment.

FIG. 12 is a diagram showing an arithmetic processing device of a measuring-device inspection apparatus according to the second exemplary embodiment.

An arithmetic processing device 200 according to the second exemplary embodiment includes a first processing-region setting unit 312 and a second processing-region setting unit 314 as a processing-region setting unit 310. A center-of-gravity calculating unit 340 includes a first center-of-gravity calculating unit 341 and a second center-of-gravity calculating unit 342.

The operation in a defect inspection method for a disk-shaped graduation plate according to the second exemplary embodiment is described below.

In the second exemplary embodiment, the image-data acquisition step (ST110) and the coordinate transformation step (ST120) in the first exemplary embodiment are also performed to generate polar-coordinate graduation image data 221.

Figure 13:
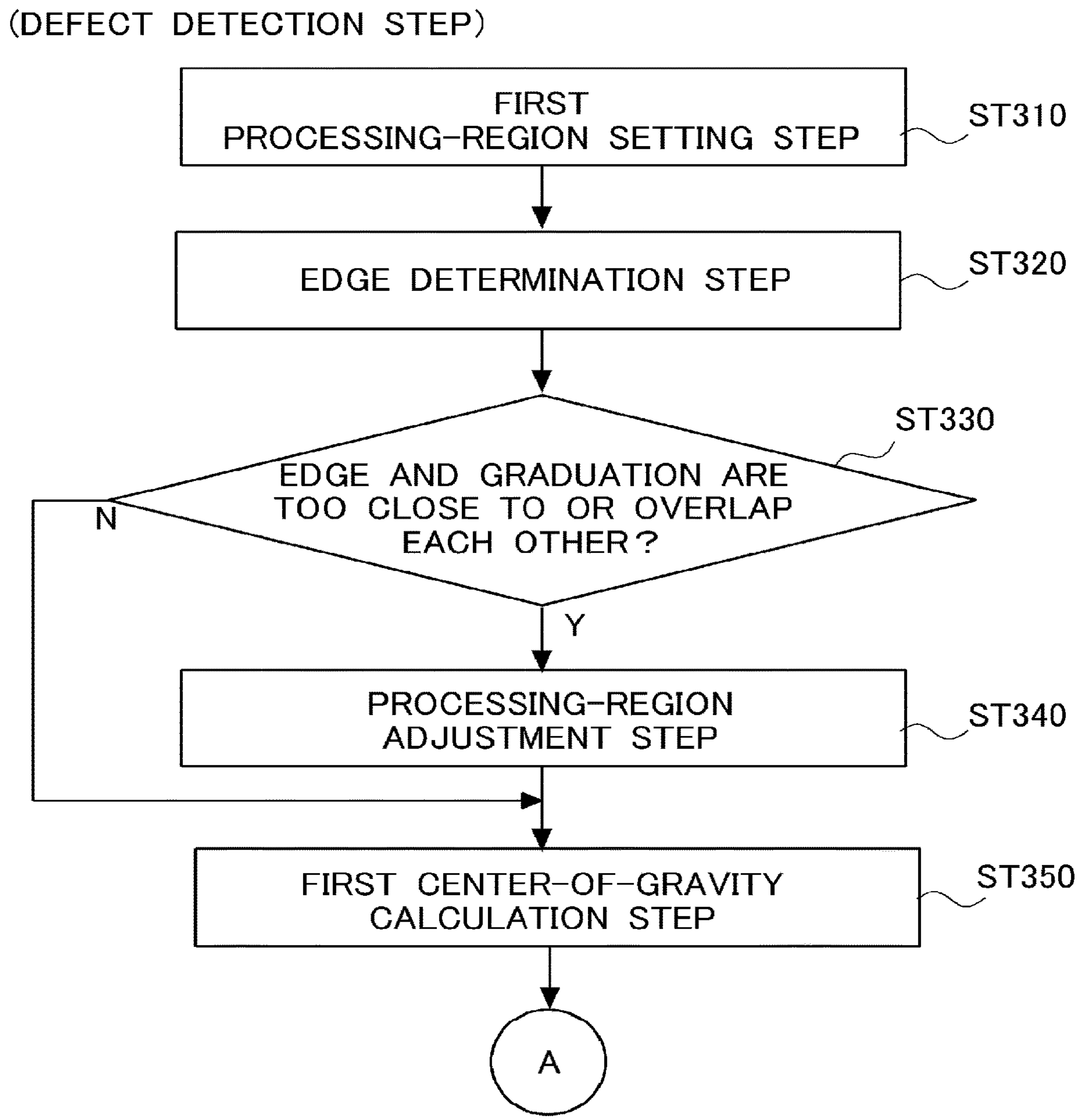
FIG. 13 is a flowchart for explaining the operation in a defect detection step (ST300) in the second exemplary embodiment.
Figure 14:
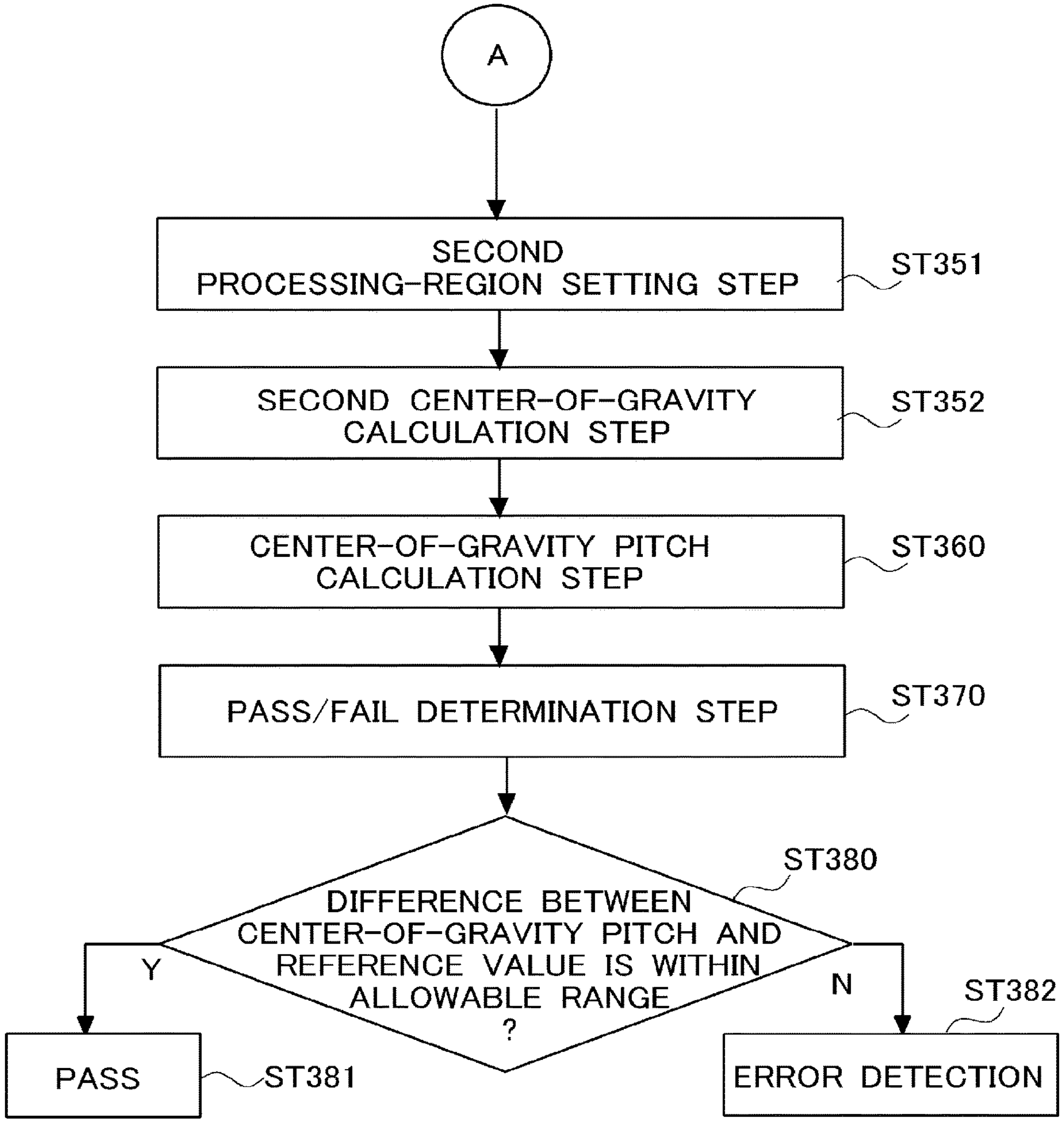
FIG. 14 is a flowchart for explaining the operation in the defect detection step (ST300) in the second exemplary embodiment.

FIGS. 13 and 14 are flowcharts for explaining the operation in a defect detection step (ST300) according to the second exemplary embodiment.

In the second exemplary embodiment, a processing region is first arranged on the polar-coordinate graduation image data 221 (a first processing-region setting step ST310). Here, the processing region is a processing region corresponding to each of graduations 40, and is referred to as a first processing region 313. When the number of graduations is N, the width of each first processing region 313 is equivalent to (360°/N). This width is referred to as a first width.

Figure 15:
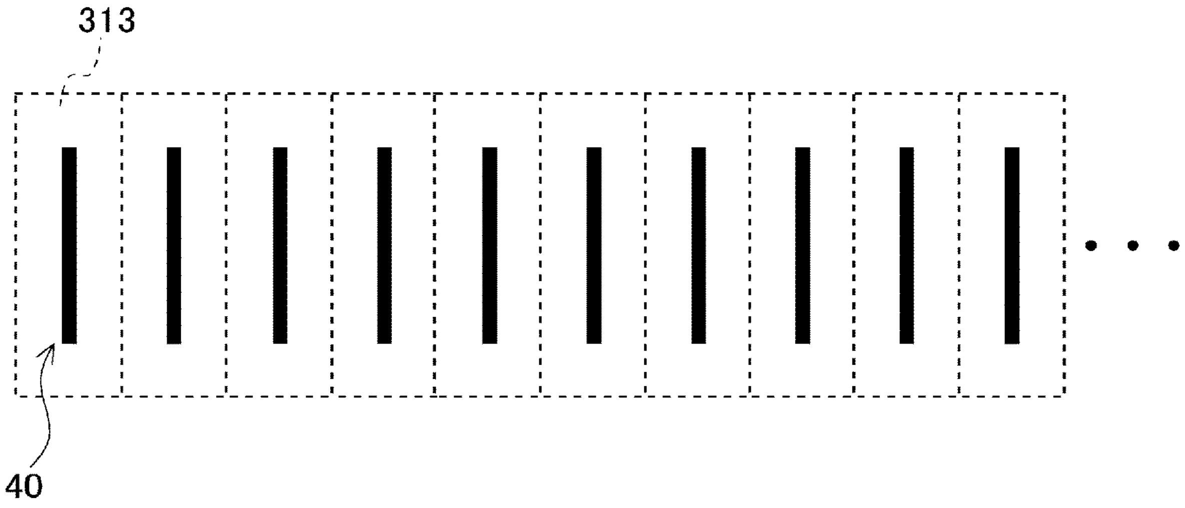
FIG. 15 is a diagram showing that a first processing region is arranged (mapped) on an angle linear display axis.

FIG. 15 is a diagram showing an example of the first processing regions 313 arranged (mapped) on the angle display axis. Here, as in the first exemplary embodiment, when the edge of a first processing region 313 is determined to be too close to or overlaps a graduation in an edge determination step (ST320) (ST330: YES), the first processing regions 313 are shifted along the angle display axis by half the width of two adjacent graduations, which is an amount equivalent to (360°/2N) (a processing-region adjustment step ST340).

Then, the position of the center of gravity is calculated for each first processing region 313 by the first center-of-gravity calculating unit 341 (a first center-of-gravity calculation step ST350). The center of gravity calculated for each first processing region 313 is referred to as a first center of gravity. From the calculated position of the first center of gravity, the pitch of the graduations 40 may be calculated.

However, the width of the first processing region 313 is considerably wider than the width of each graduation 40 to be inspected, and a region other than the graduation is largely surrounded. Therefore, the position of the first center of gravity is easily affected by elements other than the graduation (the surface of the graduation plate). For example, uneven illumination when the graduation plate 20 is imaged by a camera 110 can also affect the position of the first center of gravity.

Therefore, a second processing region 315 with a narrower width than the first processing region 313 is prepared, and the second processing region 315 is arranged (mapped) to surround each first center of gravity (a second processing-region setting step ST351).

Figure 16:
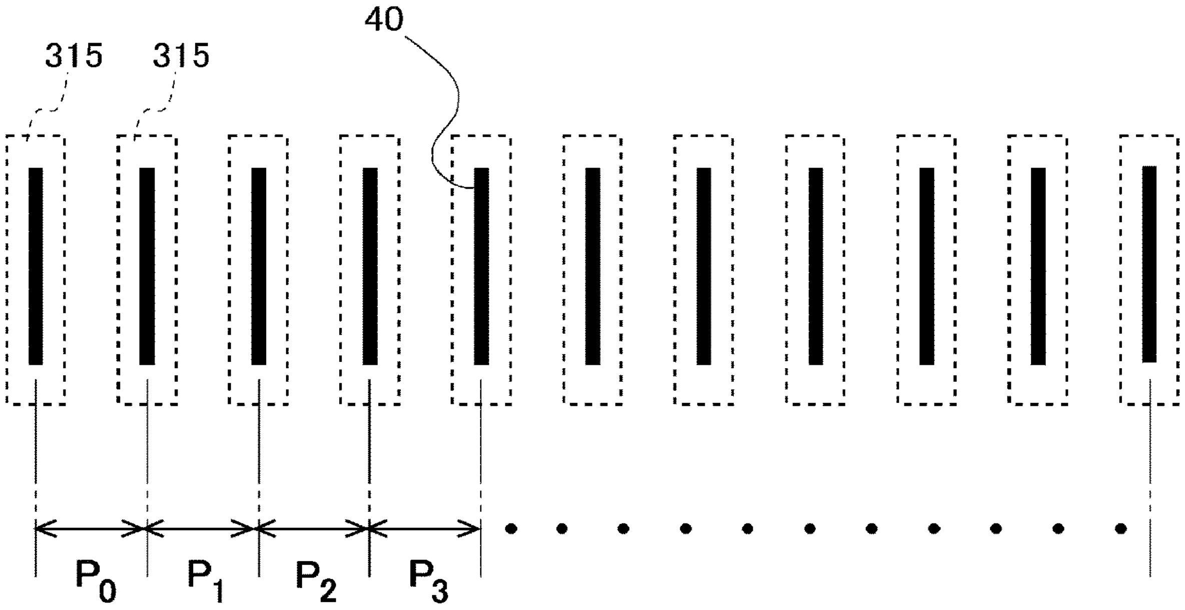
FIG. 16 is a diagram showing that a second processing region is arranged (mapped) on the angle linear display axis.

FIG. 16 is a diagram showing that the second processing region 315 is arranged (mapped) on the angle display axis.

The width of the second processing region 315 may be set based on the width of the design graduation to be twice or three times the width of the graduation. Alternatively, the width of the second processing region 315 may be set based on the width of the first processing region 313 (width of two adjacent graduations) to be half or one-third the width of the first processing region 313 (width of two adjacent graduations).

Then, the position of the center of gravity is calculated for each second processing regions 315 by the second center-of-gravity calculating unit 342 (a second center-of-gravity calculation step ST352). The calculated second center of gravity corresponds to the position of the graduation (center of the graduation) more properly than the first center of gravity.

The center-of-gravity pitch calculating unit 350 calculates the center-of-gravity pitch using the second center of gravity (a center-of-gravity pitch calculation step ST360). As a pass/fail determination, the center-of-gravity pitch is compared one by one with a reference value (nominal value or design aimed value) to determine whether the pitch of the graduations matches the design value (nominal value) or whether the pitch of the graduations is within an allowable range (a pass/fail determination step ST370).

As the pass/fail determination, the pitch variation may be determined as in the first exemplary embodiment. However, in the second exemplary embodiment, since measuring devices are to be inspected prior to product shipment, it is considered to be no scratches or dirt and that almost no pitch variation is detected. Since the main purpose of the second exemplary embodiment is to inspect whether the graduation plate is assembled as designed, it is preferable to verify the accuracy of the center-of-gravity pitch (graduation interval) by comparing it with a reference value (nominal value).

As described above, according to the second exemplary embodiment, it is possible to inspect the accuracy of the graduations. The inspection prior to product shipment confirms whether the graduation plate has defects, and if a problem is found, the defected graduation plate can be replaced as soon as possible to eliminate the problem. After the graduation plate has passed the defect inspection, the accuracy is determined by comparing the indication errors between the graduation plate and a master measuring device. If an indication error is found to be defective, the defect can be quickly determined that the problem is not with the graduation plate but with an internal mechanism, and the cause can be easily clarified.

The present invention is not limited to the above exemplary embodiments, and may be modified as appropriate without departing from the gist.

The graduation plate can be an analog graduation plate (analog dial face) with graduations engraved or printed on an actual plate, or a disk-shaped graduation plate displayed on a digital display panel, such as a liquid crystal panel or organic EL panel.

The above exemplary embodiments describe an example in which the pointer of the graduation plate rotates 360° (or more) per revolution and the graduations are provided to evenly divide 360° accordingly.

Figure 17:
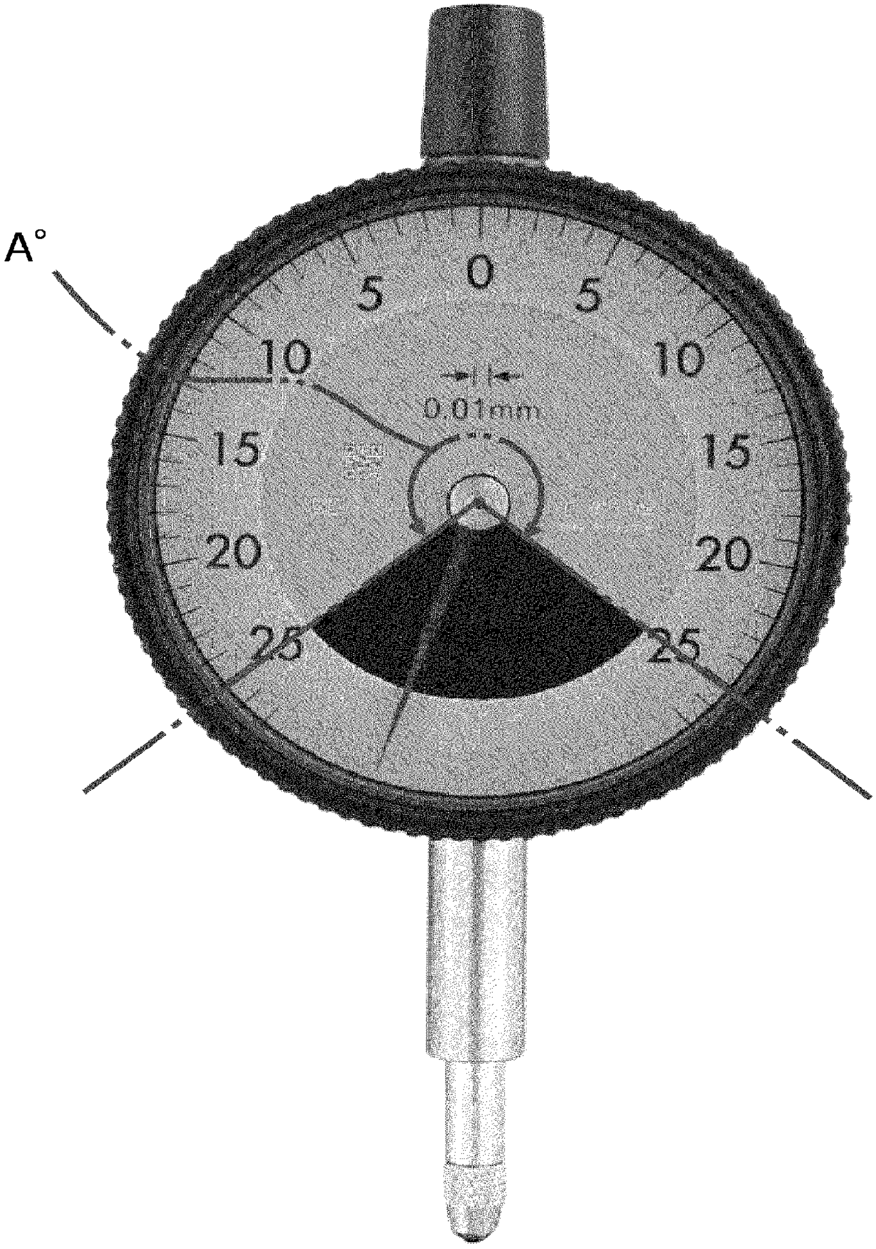
FIG. 17 is a diagram showing an example of an analog display of a measuring device with less than one rotation.

Some analog displays of measuring devices have less than one rotation as shown in FIG. 17, for example. In such cases, when the width of the processing region is calculated, the processing region with a width equivalent to (A°/N)×k is set according to the center angle A° of the range of the graduations on the graduation plate to be inspected for accuracy and the number of graduations N in that range.

10 Dial gauge (Measuring device)
20 Graduation plate
40 Graduation
200 Arithmetic processing device
211 Disk-shaped graduation-plate image data
220 Coordinate transforming unit
221 Polar-coordinate graduation image data
310 Processing-region setting unit
311 Processing region
312 First processing-region setting unit
313 First processing region
314 Second processing-region setting unit
315 Second processing region
320 Edge determining unit
340 Center-of-gravity calculating unit
341 First center-of-gravity calculating unit
342 Second center-of-gravity calculating unit
360 Pass/fail determining unit

The invention claimed is:

1. A method of inspecting a disk-shaped graduation plate for defects, the method comprising:

acquiring data about an image of the disk-shaped graduation plate as disk-shaped graduation-plate image data;

transforming the disk-shaped graduation-plate image data into polar coordinates using a center of the disk-shaped graduation plate as a reference to generate polar-coordinate graduation image data; and detecting a defect in the disk-shaped graduation plate by comparing a pitch of graduations in the polar-coordinate graduation image data with a predetermined reference value, wherein the transforming further includes expressing an angle parameter as a straight angle linear display axis to align graduations in the polar-coordinate graduation image data in parallel, and the detecting further includes:

setting a first processing region having a first width equivalent to (A°/N) on the angle linear display axis, where a center angle of a range in which the graduations are provided on the disk-shaped graduation plate is A°, and the number of the graduations on the disk-shaped graduation plate is N, and calculating a center of gravity for each first processing region.

2. The method of inspecting the disk-shaped graduation plate according to claim 1, further comprising, before the calculating:

determining whether an edge of the first processing region and a graduation are close to each other within a predetermined threshold or overlap each other; and shifting the first processing region along the angle linear display axis by half a width of two adjacent graduations being an amount equivalent to (A°/2N), when the edge and the graduation are determined to be close to each other within the predetermined threshold or overlap each other in the determining.

3. The method of inspecting the disk-shaped graduation plate according to claim 1, further comprising,
   second setting, for each center of gravity calculated in the calculating, a second processing region having a width narrower than the first processing region; and
   second calculating a center of gravity for each second processing region.

4. The method of inspecting the disk-shaped graduation plate according to claim 1, wherein
   the acquiring further includes:
      acquiring data about a plurality of images of the disk-shaped graduation plate with different positions of a pointer; and
   acquiring the disk-shaped graduation-plate image data from which the pointer is substantially excluded based on the plurality of image data.

5. The method of inspecting the disk-shaped graduation plate according to claim 4, wherein
   the acquiring further includes:
      averaging the data about the plurality of images to acquire the disk-shaped graduation-plate image data.

6. The method of inspecting the disk-shaped graduation plate according to claim 4, wherein
   the acquiring further includes:
      obtaining the median of luminance value for each corresponding pixel of the plurality of image data or obtaining the average value of the luminance values of several data near the median value for each corresponding pixel of the plurality of image data to acquire the disk-shaped graduation-plate image data.

7. A defect inspection apparatus for a disk-shaped graduation plate, the defect inspection apparatus comprising:
   image-data acquiring circuitry configured to acquire data about an image of the disk-shaped graduation plate as disk-shaped graduation-plate image data;
   polar-coordinate transforming circuitry configured to transform the disk-shaped graduation-plate image data into polar coordinates using a center of the disk-shaped graduation plate as a reference to generate polar-coordinate graduation image data; and
   defect detecting circuitry configured to detect a defect in the disk-shaped graduation plate by comparing a pitch of graduations in the polar-coordinate graduation image data with a predetermined reference value, wherein
   the polar-coordinate transformation circuitry is further configured to express an angle parameter as a straight angle linear display axis to align graduations in the polar-coordinate graduation image data in parallel, and
   the defect detecting circuitry is further configured to:
      set a first processing region having a first width equivalent to (A°/N) on the angle linear display axis, where a center angle of a range in which the graduations are provided on the disk-shaped graduation plate is A°, and the number of the graduations on the disk-shaped graduation plate is N; and
      calculate a center of gravity for each first processing region.

8. A computer-readable recording medium storing an inspection program for a disk-shaped graduation plate, the program causing a computer to execute:
   acquiring data about an image of the disk-shaped graduation plate as disk-shaped graduation-plate image data;
   transforming the disk-shaped graduation-plate image data into polar coordinates using a center of the disk-shaped graduation plate as a reference to generate polar-coordinate graduation image data; and
   detecting a defect in the disk-shaped graduation plate by comparing a pitch of graduations in the polar-coordinate graduation image data with a predetermined reference value, wherein
   the transforming further includes expressing an angle parameter as a straight angle linear display axis to align graduations in the polar-coordinate graduation image data in parallel, and
   the detecting further includes:
      setting a first processing region having a first width equivalent to (A°/N) on the angle linear display axis, where a center angle of a range in which the graduations are provided on the disk-shaped graduation plate is A°, and the number of the graduations on the disk-shaped graduation plate is N, and
      calculating a center of gravity for each first processing region.

* * * * *